(12) United States Patent
Zarate (10) Patent No.: US 10,994,859 B2
(45) Date of Patent: May 4, 2021

(54) AIRCRAFT FUEL SYSTEMS HAVING FLUID LINE EXTENSION SLEEVES

(71) Applicant: Textron Innovations Inc., Providence, RI (US)

(72) Inventor: Michael Remington Zarate, Dallas, TX (US)

(73) Assignee: Textron Innovations Inc., Providence, RI (US)

(*) Notice: Subject to any disclaimer, the term of this patent is extended or adjusted under 35 U.S.C. 154(b) by 135 days.

(21) Appl. No.: 16/516,788

(22) Filed: Jul. 19, 2019

(65) Prior Publication Data

US 2021/0016889 A1    Jan. 21, 2021

(51) Int. Cl.
*B64D 37/06*      (2006.01)

(52) U.S. Cl.
CPC .................................. *B64D 37/06* (2013.01)

(58) Field of Classification Search
CPC ........ B64D 37/00; B64D 37/02; B64D 37/06; B64D 37/14; B64D 37/16; B64D 37/20
See application file for complete search history.

(56) References Cited

U.S. PATENT DOCUMENTS

| 4,345,698 A | 8/1982 | Villemain |
| 9,931,927 B2 | 4/2018 | Heater et al. |
| 2013/0313818 A1* | 11/2013 | Remfry ................. B64D 37/00 285/33 |
| 2014/0223744 A1 | 8/2014 | Childress et al. |
| 2016/0347038 A1 | 12/2016 | Childress et al. |

* cited by examiner

*Primary Examiner* — Richard G Davis
(74) *Attorney, Agent, or Firm* — Lawrence Youst PLLC (57) ABSTRACT

A fuel system for an aircraft. The fuel system includes a fuel tank configured to contain liquid fuel. A non-extendable fluid line is coupled between an airframe member of the aircraft and the fuel tank. A sleeve assembly is coupled between the fluid line and an upper surface of the fuel tank. The sleeve assembly includes a sealing sleeve and an extension sleeve. The sealing sleeve is positioned around the fluid line forming a fluid tight seal therewith and having a non-sliding relationship therewith. The extension sleeve is positioned around the fluid line with a first portion of the extension sleeve having a sliding relationship with the fluid line such that increasing the distance between the upper surface of the fuel tank and the airframe member causes the extension sleeve to increase in length as the fluid line slides relative to the first portion of the extension sleeve.

20 Claims, 9 Drawing Sheets

AIRCRAFT FUEL SYSTEMS HAVING FLUID LINE EXTENSION SLEEVES

TECHNICAL FIELD OF THE DISCLOSURE

The present disclosure relates, in general, to airworthy aircraft fuel systems and, in particular, to aircraft fuel systems having fluid line extension sleeves that minimize the risk of a fuel leak from the fuel tank and the resultant hazard of a fuel fire following a hard landing or crash landing event.

BACKGROUND

Among other responsibilities, the United States Federal Aviation Federation (FAA) established airworthiness standards for aircraft such as airplanes and rotorcraft and provides airworthiness approval for aircraft, aircraft engines, propellers and related articles which certifies that they conform to an approved design and are in a condition for safe operation. For example, part 29 of the FAA regulations is directed to airworthiness standards for transport rotorcraft, which includes section 29.952 that is directed to fuel system crash resistance. This section details design features for fuel systems intended to minimize the hazard of fuel fires to occupants following an otherwise survivable impact such as a crash landing. In addition, this section states that fuel systems must be shown to be capable of sustaining certain static and dynamic deceleration loads, considered as ultimate loads acting alone, measured at the system component's center of gravity without structural damage to the system components, fuel tanks or their attachments that could leak fuel to an ignition source.

One of the requirements for obtaining rotorcraft fuel system airworthiness approval is the successful completion of a drop test. The drop test requirements include: (1) the drop height must be at least 50 feet; (2) the drop impact surface must be nondeforming; (3) the fuel tanks must be filled with water to 80 percent of the normal, full capacity or fuel to the full capacity; (4) the fuel tank must be enclosed in a surrounding structure representative of the installation unless it can be established that the surrounding structure is free of projections or other design features likely to contribute to rupture of the tank; (5) the fuel tank must drop freely and impact in a horizontal position +/−10 degrees; and (6) after the drop test, there must be no leakage.

SUMMARY

In a first aspect, the present disclosure is directed to a fuel system for an aircraft. The fuel system includes a fuel tank configured to contain liquid fuel. A non-extendable fluid line is coupled between an airframe member and the fuel tank. A sleeve assembly is coupled between the fluid line and the upper surface of the fuel tank. The sleeve assembly includes a sealing sleeve and an extension sleeve. The sealing sleeve is positioned around the fluid line forming a fluid tight seal therewith and having a non-sliding relationship therewith. The extension sleeve is positioned around the fluid line with a first portion of the extension sleeve having a sliding relationship with the fluid line such that increasing the distance between the upper surface of the fuel tank and the airframe member causes the extension sleeve to increase in length as the fluid line slides relative to the first portion of the extension sleeve.

In certain embodiments, at least a portion of the sealing sleeve may overlap a second portion of the extension sleeve forming a multilayer sleeve section around the fluid line. In such embodiments, a mechanical compression coupling, such as a worm screw clamp, may be positioned around the multilayer sleeve section to create a non-sliding relationship between the fluid line and the second portion of the extension sleeve. In some embodiments, the extension sleeve may be integral with the fuel tank. In other embodiments, the extension sleeve may be coupled to the fuel tank. In certain embodiments, the extension sleeve may be a rubber sleeve. In some embodiments, the first portion of the extension sleeve may be an accordion sleeve. In certain embodiments, the sealing sleeve may be a silicone boot such as a silicone rubber boot. In some embodiments, the fluid line may be a fuel line. In certain embodiments, the fluid line may be a metal fluid line such as an aluminum fluid line. In some embodiments, the fluid line may extend into an interior of the fuel tank. In certain embodiments, the fuel tank may be a fuel bladder.

In a second aspect, the present disclosure is directed to an aircraft. The aircraft includes a fuselage having a fuel tank airframe including an airframe member. A fuel tank is supported by the fuel tank airframe and is positioned below the airframe member. The fuel tank has an upper surface and is configured to contain liquid fuel. A non-extendable fluid line is coupled between the airframe member and the fuel tank. A sleeve assembly is coupled between the fluid line and the upper surface of the fuel tank. The sleeve assembly includes a sealing sleeve and an extension sleeve. The sealing sleeve is positioned around the fluid line forming a fluid tight seal therewith and having a non-sliding relationship therewith. The extension sleeve is positioned around the fluid line with a first portion of the extension sleeve having a sliding relationship with the fluid line such that increasing the distance between the upper surface of the fuel tank and the airframe member causes the extension sleeve to increase in length as the fluid line slides relative to the first portion of the extension sleeve.

In some embodiments, the aircraft may be a rotorcraft such as a rotorcraft having a plurality of rotor systems. In certain embodiments, the aircraft may be an air taxi having a plurality of rotor systems. In such embodiments, the air taxi may include a turbo-generator in fluid communication with the fuel tank via the fluid line. The turbo-generator may include a gas turbine engine driving an electric generator that may charge an array of batteries that provides power to electric motors of the rotor systems.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including moving and/or non-moving mechanical connections.

Figure 1A:
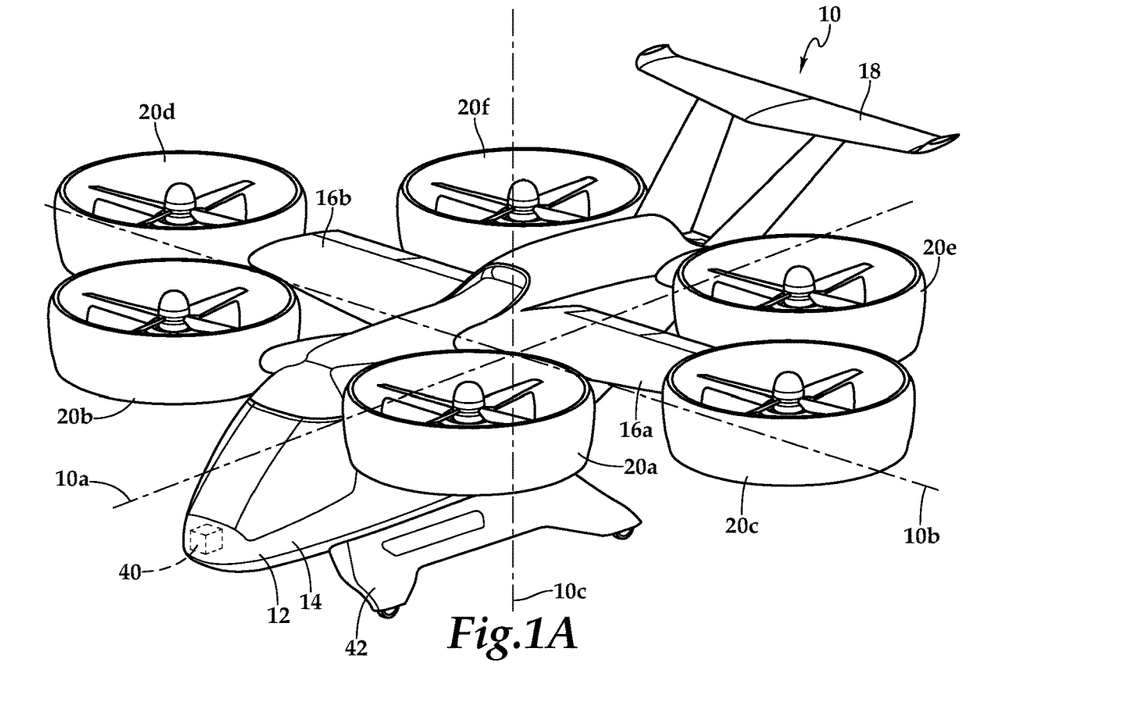
FIGS. 1A-1F are schematic illustrations of an aircraft having a fuel system with fluid line extension sleeves in accordance with embodiments of the present disclosure.
Figure 1B:
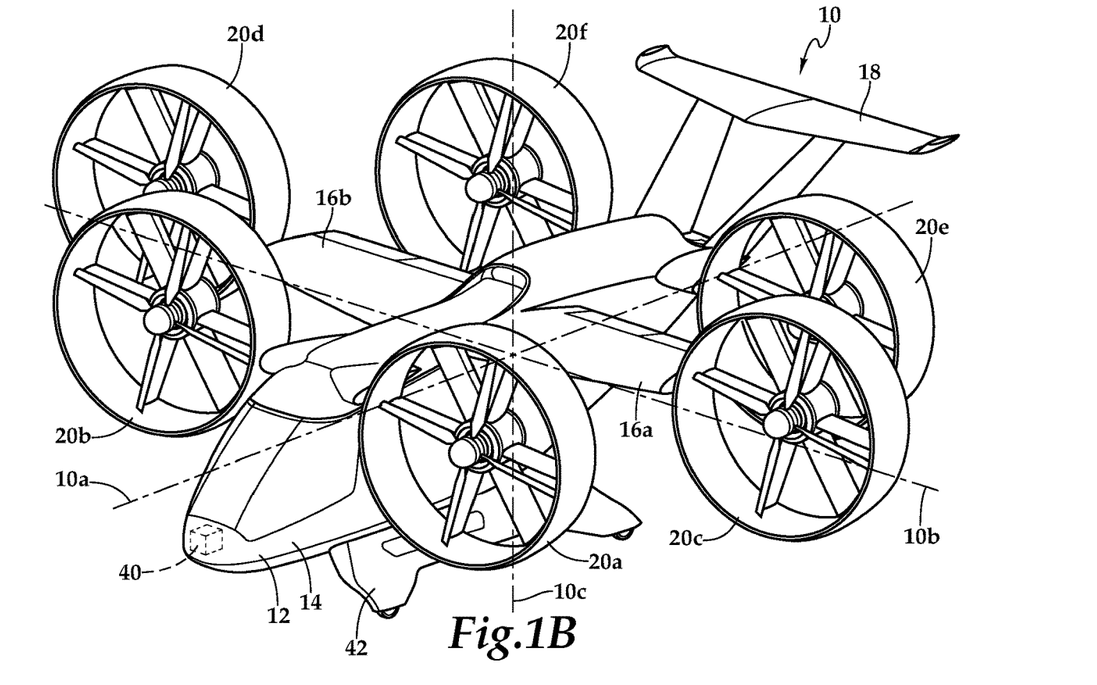
Figure 1C:
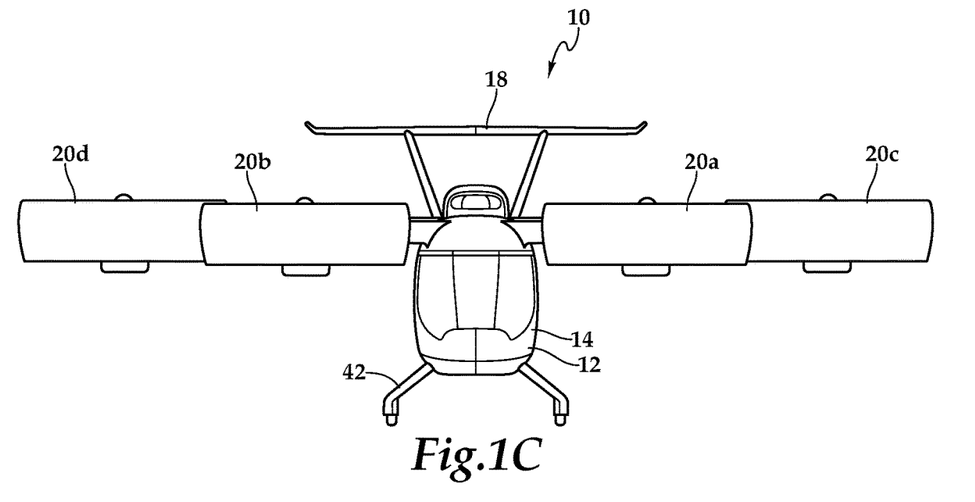
Figure 1D:
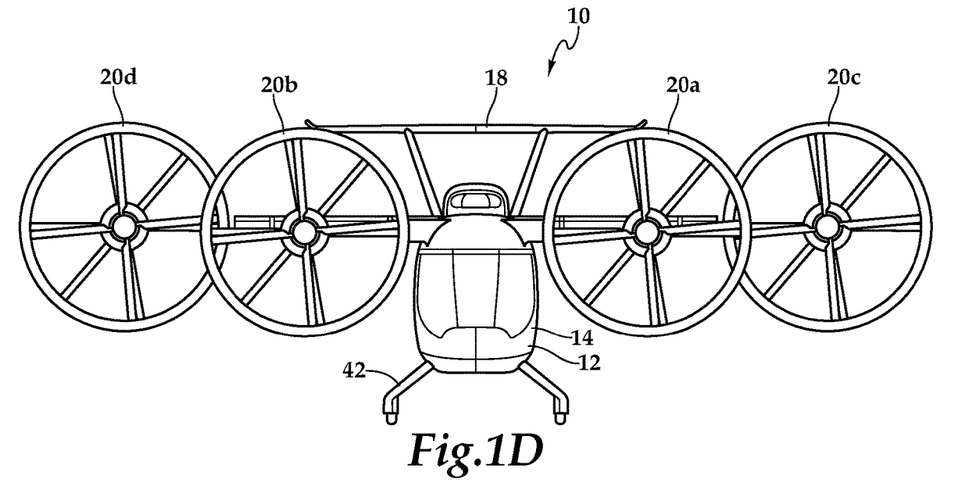
Figure 1E:
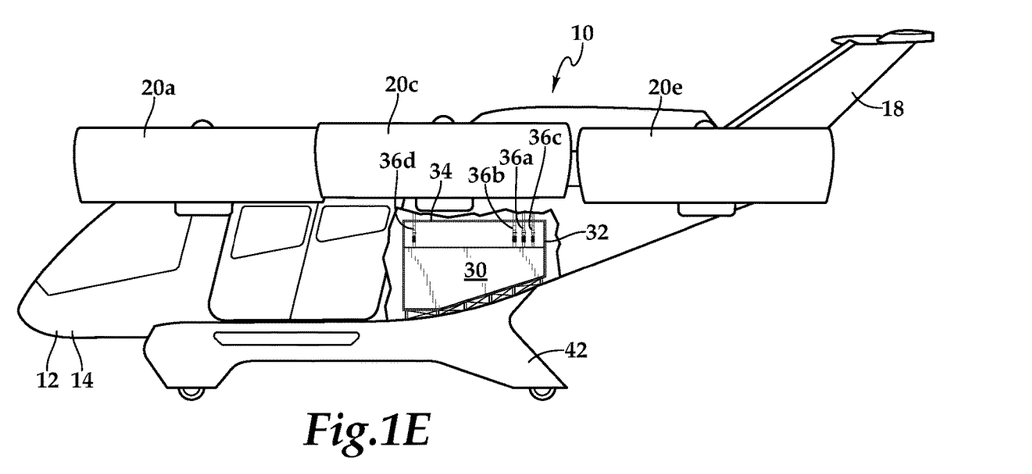
Figure 1F:
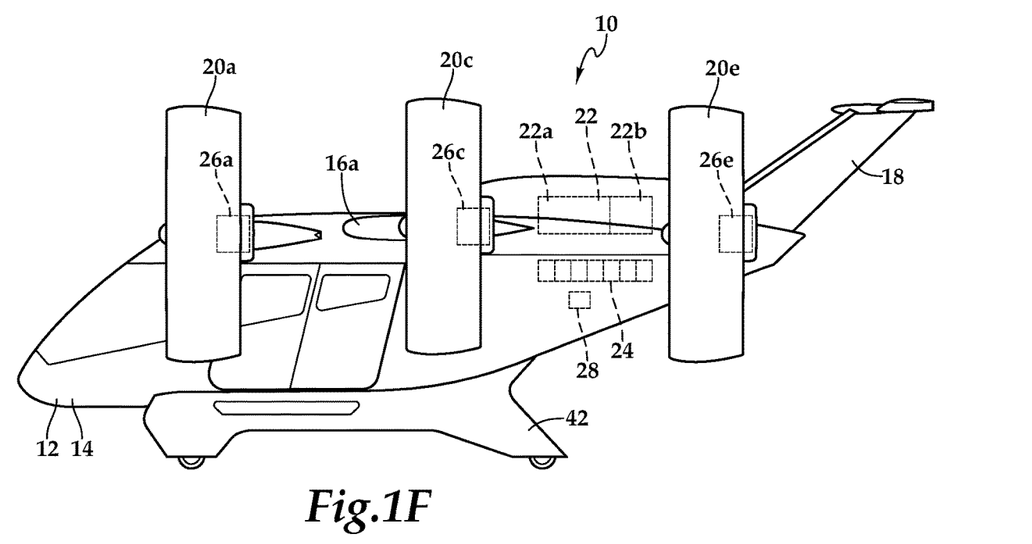

Referring to FIGS. 1A-1G in the drawings, various views of an aircraft 10 having a fuel system with fluid line extension sleeves are depicted. FIGS. 1A, 1C, 1E depict aircraft 10 in a VTOL orientation wherein the rotor systems provide thrust-borne lift. FIGS. 1B, 1D, 1F depict aircraft 10 in a forward flight orientation wherein the rotor systems provide forward thrust with the forward airspeed of aircraft 10 providing wing-borne lift enabling aircraft 10 to have a high speed and/or high endurance forward flight mode. Aircraft 10 has a longitudinal axis 10a that may also be referred to as the roll axis, a lateral axis 10b that may also be referred to as the pitch axis and a vertical axis 10c that may also be referred to as the yaw axis, as best seen in FIGS. 1A and 1B. As illustrated, when longitudinal axis 10a and lateral axis 10b are both in a horizontal plane that is normal to the local vertical in the earth's reference frame, aircraft 10 has a level flight attitude.

In the illustrated embodiment, aircraft 10 has an airframe 12 including a fuselage 14, wings 16a, 16b and a tail assembly 18. Each of wings 16a, 16b has an airfoil cross-section that generates lift responsive to the forward airspeed of aircraft 10. In the illustrated embodiment, wings 16a, 16b are straight wings with a tapered leading edge. It will be appreciated, however, that wings 16a, 16b may be of a wide variety of shapes, sizes and configurations, depending upon the performance characteristics desired. In the illustrated embodiment, wings 16a, 16b include ailerons to aid in roll and/or pitch control of aircraft 10 during forward flight. Tail assembly 18 is depicted as having a pair of vertical stabilizers that may include one or more rudders to aid in yaw control of aircraft 10 during forward flight. In addition, tail assembly 18 has a horizontal stabilizer that may include one or more elevators to aid in pitch control of aircraft 10 during forward flight. It will be appreciated, however, that tail assembly 18 may be of a wide variety of shapes, sizes and configurations, depending upon the performance characteristics desired.

In the illustrated embodiment, aircraft 10 includes six rotor systems forming a two-dimensional distributed thrust array that is coupled to airframe 12. As used herein, the term "two-dimensional thrust array" refers to a plurality of thrust generating elements that occupy a two-dimensional space in the form of a plane. As used herein, the term "distributed thrust array" refers to the use of multiple thrust generating elements each producing a portion of the total thrust output. The thrust array of aircraft 10 includes a forward-port rotor system 20a, a forward-starboard rotor system 20b, a mid-port rotor system 20c, a mid-starboard rotor system 20d, an aft-port rotor system 20e and an aft-starboard rotor system 20f, which may be referred to collectively as rotor systems 20. Forward-port rotor system 20a and forward-starboard rotor system 20b are each rotatably mounted to a shoulder portion of fuselage 12 at a forward station thereof. Mid-port rotor system 20c is rotatably mounted on the outboard end of wing 16a. Mid-starboard rotor system 20d is rotatably mounted on the outboard end of wing 16b. Aft-port rotor system 20e and aft-starboard rotor system 20f are each rotatably mounted to a shoulder portion of fuselage 12 at an aft station thereof. As illustrated, aircraft 10 is a rotorcraft having a plurality of rotor system such that aircraft 10 may operate as air taxi to provide air taxi services.

In the illustrated embodiment, rotor systems 20 are ducted rotor systems each having a four bladed rotor assembly with variable pitch rotor blades operable for collective pitch control. Rotor systems 20 each include at least one variable speed electric motor and a speed controller configured to provide variable speed control to the rotor assembly over a wide range of rotor speeds. In other embodiments, the thrust array of aircraft 10 could include more than or less than six rotor system, the rotor systems could be non-ducted or open rotor systems, the number of rotor blades could be either greater than or less than four and/or the rotor blades could have a fixed pitch.

When aircraft 10 is operating in the VTOL orientation and supported by thrust-borne lift, rotor systems 20 each have a generally horizontal orientation such that the rotor assemblies are rotating in generally in the same horizontal plane, as best seen in FIGS. 1C, 1E. When aircraft 10 is operating in the forward flight orientation and supported by wing-borne lift, rotor systems 20 each have a generally vertical orientation with the forward rotor assemblies rotating generally in a forward vertical plane, the mid rotor assemblies rotating generally in a mid vertical plane and the aft rotor assemblies rotating generally in an aft vertical plane, as best seen in FIG. 1F. Transitions between the VTOL orientation and the forward flight orientation of aircraft 10 are achieved by changing the angular positions of rotor systems 20 between their generally horizontal orientations and the generally vertical orientations as discussed herein.

Aircraft 10 includes a liquid fuel powered turbo-generator 22 that includes a gas turbine engine 22a and an electric generator 22b. Preferably, electric generator 22b charges an array of batteries 24 that provides power to the electric motors of rotor systems 20 such as electric motors 26a, 26c, 26e via a power management system 28, as best seen in FIG. 1F. In other embodiments, turbo-generator 22 may provide power directly to power management system 28 and/or the electric motors of rotor systems 20. In yet other embodiments, rotor systems 20 may be mechanically driven by the power plant of aircraft 10 via suitable gearing, shafting and clutching systems. Liquid fuel is provided to turbo-generator 22 from one or more fuel tanks 30 that are supported by a fuel tank airframe 32 having an airframe member 34 positioned above fuel tanks 30, as best seen in FIG. 1E. A plurality of fluid lines 36, such as a fuel line 36a, a fill line 36b, a vent line 36c, a sensor line 36d or other lines configured for fluid transfer, extend from fuel tank 30 and are preferably coupled to and/or fixed relative to airframe member 34. As discussed herein, each of fluid lines 36 is coupled to fuel tank 30 by a sleeve assembly including an extension sleeve in order to minimize the risk of a fuel leak from fuel tank 30 and the resultant hazard of a fuel fire following, for example, a hard landing or crash landing event.

Aircraft 10 has a fly-by-wire control system that includes a flight control system 40 that is preferably a redundant digital flight control system including multiple independent flight control computers. Flight control system 40 preferably includes non-transitory computer readable storage media including a set of computer instructions executable by one or more processors for controlling the operation of aircraft 10. Flight control system 40 may be implemented on one or more general-purpose computers, special purpose computers or other machines with memory and processing capability. Flight control system 40 may include one or more memory storage modules including random access memory, non-volatile memory, removable memory or other suitable memory entity. Flight control system 40 may be a microprocessor-based system operable to execute program code in the form of machine-executable instructions. Flight control system 40 may be connected to other computer systems via a suitable communication network that may include both wired and wireless connections.

Flight control system 40 communicates via a wired communications network within airframe 12 with the electronics nodes of each rotor system 20. Flight control system 40 receives sensor data from and sends flight command information to rotor systems 20 such that each rotor system 20 may be individually and independently controlled and operated. For example, flight control system 40 is operable to individually and independently control the rotor speed and the collective pitch of each rotor system 20 as well as the angular position of each rotor system 20. Flight control system 40 may autonomously control some or all aspects of flight operation for aircraft 10. Flight control system 40 is also operable to communicate with remote systems, such as a ground station via a wireless communications protocol. The remote system may be operable to receive flight data from and provide commands to flight control system 40 to enable remote flight control over some or all aspects of flight operation for aircraft 10. In addition, aircraft 10 may be pilot operated such that a pilot interacts with a pilot interface that receives flight data from and provide commands to flight control system 40 to enable onboard pilot control over some or all aspects of flight operation for aircraft 10.

Aircraft 10 includes a landing gear 42 for ground operations. Landing gear 42 may include passively operated pneumatic landing struts or actively operated landing struts. In the illustrated embodiment, landing gear 42 includes a plurality of wheels that enable aircraft 10 to taxi and perform other ground maneuvers. Landing gear 42 may include a passive brake system, an active brake system such as an electromechanical braking system and/or a manual brake system to facilitate parking as required during ground operations and/or passenger ingress and egress.

Figure 2A:
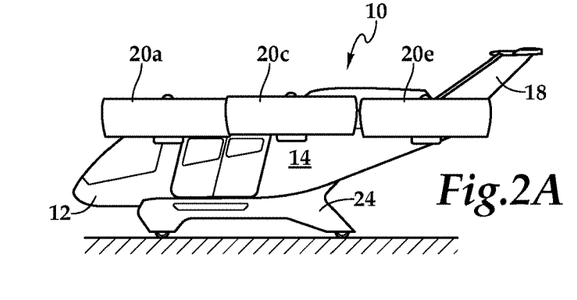
FIGS. 2A-2H are schematic illustrations of an aircraft having a fuel system with fluid line extension sleeves in a sequential flight operating scenario in accordance with embodiments of the present disclosure.

Referring additionally to FIGS. 2A-2H in the drawings, a sequential flight-operating scenario of aircraft 10 is depicted. As best seen in FIG. 2A, aircraft 10 is positioned on a surface prior to takeoff. When aircraft 10 is ready for a mission, flight control system 40 commences operations to provide flight control to aircraft 10 which may be onboard pilot flight control, remote flight control, autonomous flight control or a combination thereof. For example, it may be desirable to utilize onboard pilot flight control during certain maneuvers such as takeoff and landing but rely on autonomous flight control during hover, high speed forward flight and/or transitions between wing-borne lift and thrust-borne lift.

Figure 2B:
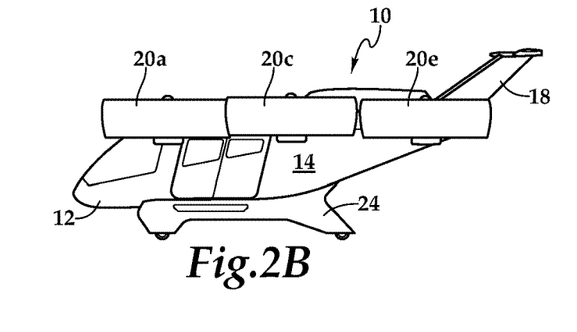

As best seen in FIG. 2B, aircraft 10 has performed a vertical takeoff and is engaged in thrust-borne lift. As illustrated, the rotor assemblies of each rotor system 20 are rotating in the same horizontal plane forming a two-dimensional distributed thrust array of six rotor systems. As the longitudinal axis and the lateral axis of aircraft 10 are both in the horizontal plane, aircraft 10 has a level flight attitude. During hover, flight control system 40 may utilize individual variable speed control capability of rotor systems 20 to control flight dynamics to maintain hover stability and to provide pitch, roll and yaw authority for aircraft 10.

Figures 2C, 2D:
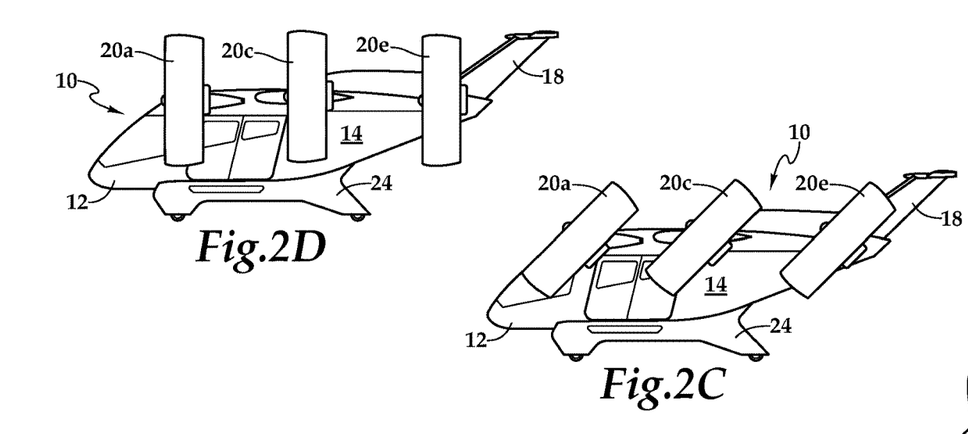
Figure 2E:
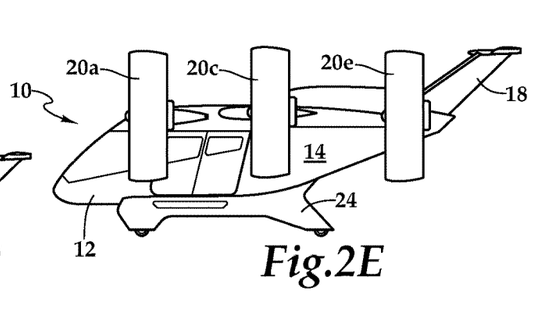

After vertical assent to the desired elevation, aircraft 10 may begin the transition from thrust-borne lift to wing-borne lift. As best seen from the progression of FIGS. 2B-2D, the angular positions of rotor systems 20 are changed by a pitch down rotation to transition aircraft 10 from the VTOL orientation toward the forward flight orientation. As seen in FIG. 2C, rotor systems 20 have been collectively inclined about forty-five degrees pitch down. In the conversion orientations of aircraft 10, a portion of the thrust generated by rotor systems 20 provides lift while a portion of the thrust generated by rotor systems 20 urges aircraft 10 to accelerate in the forward direction such that the forward airspeed of aircraft 10 increases allowing wings 16a, 16b to offload a portion and eventually all of the lift requirement from rotor systems 20. As best seen in FIG. 2D, rotor systems 20 have been collectively inclined about ninety degrees pitch down such that the rotor assemblies are rotating in vertical planes providing forward thrust for aircraft 10 with wings 16a, 16b providing lift. Even though the conversion from the VTOL orientation to the forward flight orientation of aircraft 10 has been described as progressing with collective pitch down rotation of rotor systems 20, in other implementation, all rotor systems 20 need not be operated at the same time or at the same rate.

Figure 2F:
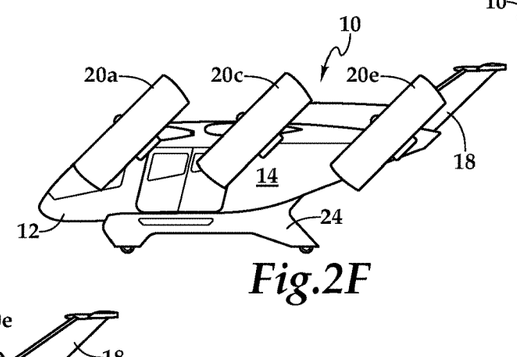
Figure 2G:
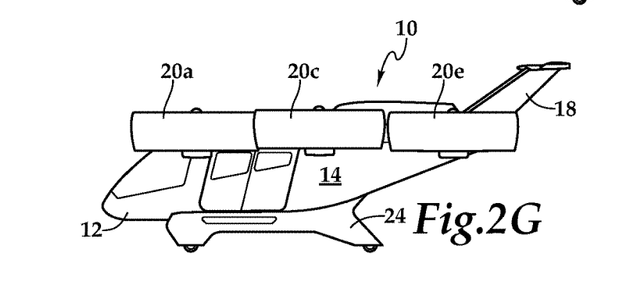
Figure 2H:
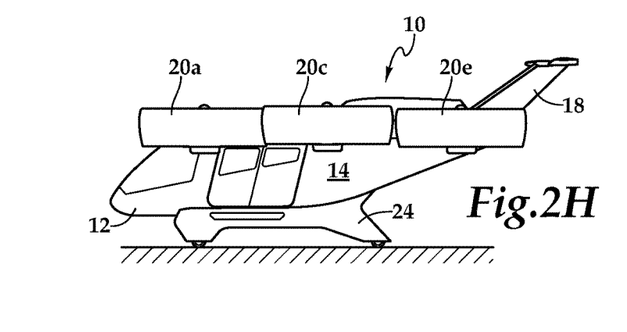

As forward flight with wing-borne lift requires significantly less thrust than VTOL flight with thrust-borne lift, the operating speed of some or all of rotor systems 20 may be reduced particularly in embodiments having collective pitch control. In certain embodiments, some of rotor systems 20 of aircraft 10 could be shut down during forward flight. As aircraft 10 approaches its destination, aircraft 10 may begin its transition from wing-borne lift to thrust-borne lift. As best seen from the progression of FIGS. 2E-2G, the angular positions of rotor systems 20 are changed by a pitch up rotation to transition aircraft 10 from the forward flight orientation toward the VTOL orientation. As seen in FIG. 2F, rotor systems 20 have been collectively inclined about forty-five degrees pitch up. In the conversion orientations of aircraft 10, a portion of the thrust generated by rotor systems 20 begins to provide lift for aircraft 10 as the forward airspeed decreases and the lift producing capability of wings 16a, 16b decreases. As best seen in FIG. 2G, rotor systems 20 have been collectively inclined about ninety degrees pitch up such that the rotor assemblies are rotating in the horizontal plane providing thrust-borne lift for aircraft 10. Even though the conversion from the forward flight orientation to the VTOL orientation of aircraft 10 has been described as progressing with collective pitch up rotation of rotor systems 20, in other implementation, all rotor systems 20 need not be operated at the same time or at the same rate. Once aircraft 10 has completed the transition to the VTOL orientation, aircraft 10 may commence its vertical descent to a surface. As best seen in FIG. 2H, aircraft 10 has landing at the destination location.

Figure 3:
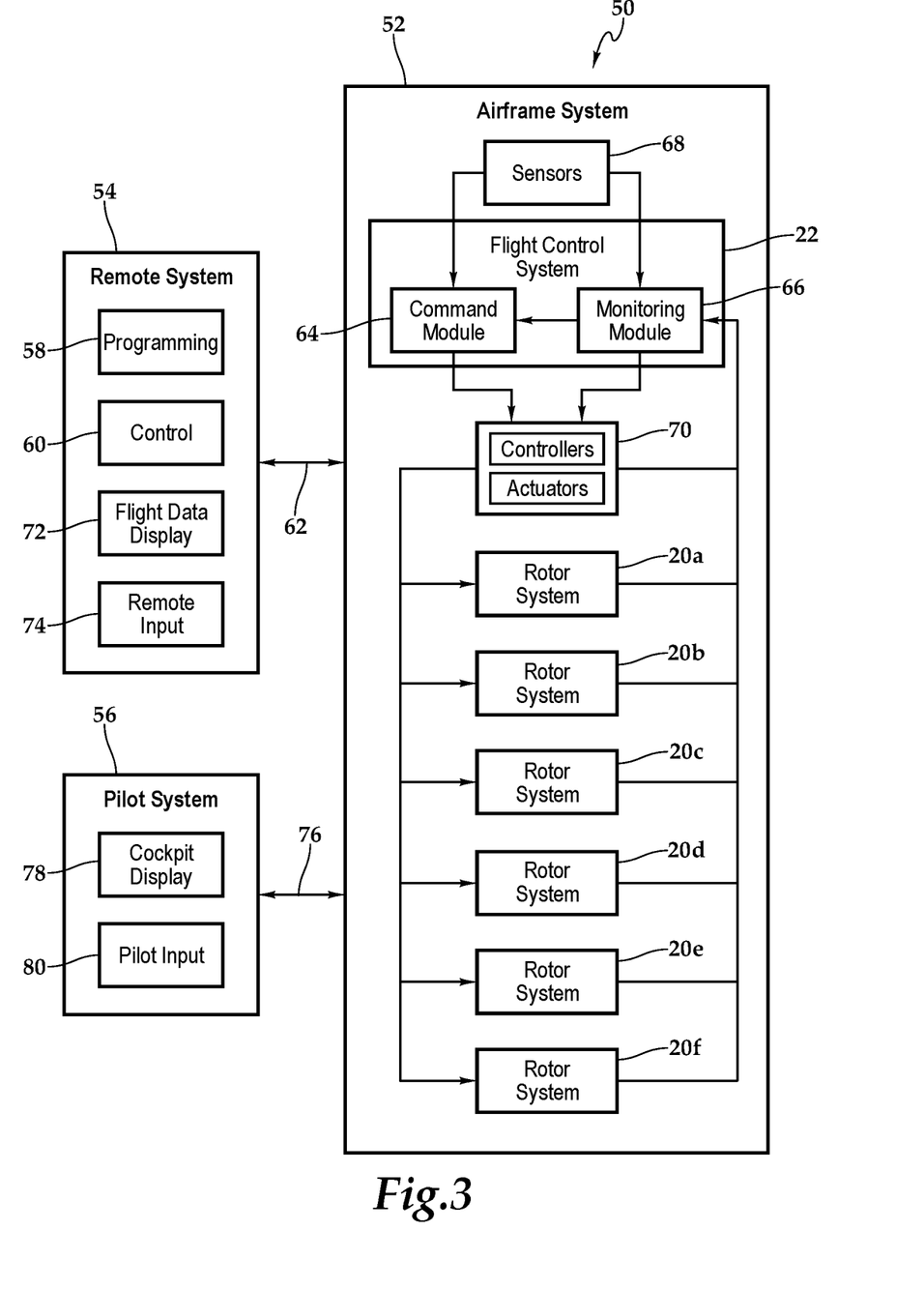
FIG. 3 is a block diagram of control systems for an aircraft having a fuel system with fluid line extension sleeves in accordance with embodiments of the present disclosure.

Referring additionally to FIG. 3 in the drawings, a block diagram depicts a control system 50 operable for use with aircraft 10 of the present disclosure. In the illustrated embodiment, system 50 includes three primary computer based subsystems; namely, an airframe system 52, a remote system 54 and a pilot system 56. In some implementations, remote system 54 includes a programming application 58 and a remote control application 60. Programming application 58 enables a user to provide a flight plan and mission information to aircraft 10 such that flight control system 40 may engage in autonomous control over aircraft 10. For example, programming application 58 may communicate with flight control system 40 over a wired or wireless communication channel 62 to provide a flight plan including, for example, a starting point, a trail of waypoints and an ending point such that flight control system 40 may use waypoint navigation during the mission.

In the illustrated embodiment, flight control system 40 is a computer based system that includes a command module 64 and a monitoring module 66. It is to be understood by those skilled in the art that these and other modules executed by flight control system 40 may be implemented in a variety of forms including hardware, software, firmware, special purpose processors and combinations thereof. Flight control system 40 receives input from a variety of sources including internal sources such as sensors 68, controllers and actuators 70 and rotor systems 20a-20f and external sources such as remote system 54 as well as global positioning system satellites or other location positioning systems and the like. During the various operating modes of aircraft 10 including VTOL mode, forward flight mode and transitions therebetween, command module 64 provides commands to controllers and actuators 70. These commands enable independent operation of each rotor system 20a-20f including rotor speed, collective pitch and angular position. Flight control system 40 receives feedback from controllers and actuators 70 and rotor systems 20a-20f This feedback is processed by monitoring module 66 that can supply correction data and other information to command module 64 and/or controllers and actuators 70. Sensors 68, such as vibration sensors, location sensors, attitude sensors, speed sensors, environmental sensors, fuel sensors, temperature sensors and the like also provide information to flight control system 40 to further enhance autonomous control capabilities.

Some or all of the autonomous control capability of flight control system 40 can be augmented or supplanted by remote flight control from, for example, remote system 54. Remote system 54 may include one or computing systems that may be implemented on general-purpose computers, special purpose computers or other machines with memory and processing capability. Remote system 54 may be a microprocessor-based system operable to execute program code in the form of machine-executable instructions. In addition, remote system 54 may be connected to other computer systems via a proprietary encrypted network, a public encrypted network, the Internet or other suitable communication network that may include both wired and wireless connections. Remote system 54 communicates with flight control system 40 via communication link 62 that may include both wired and wireless connections.

While operating remote control application 60, remote system 54 is configured to display information relating to one or more aircraft of the present disclosure on one or more flight data display devices 72. Remote system 54 may also include audio output and input devices such as a microphone, speakers and/or an audio port allowing an operator to communicate with other operators, a base station and/or a pilot onboard aircraft 10. The display device 72 may also serve as a remote input device 74 if a touch screen display implementation is used, however, other remote input devices, such as a keyboard or joystick, may alternatively be used to allow an operator to provide control commands to an aircraft being operated responsive to remote control.

Some or all of the autonomous and/or remote flight control of aircraft 10 can be augmented or supplanted by onboard pilot flight control from a pilot interface system 56 that includes one or more computing systems that communicate with flight control system 40 via one or more wired communication channels 76. Pilot system 56 preferably includes one or more cockpit display devices 78 configured to display information to the pilot. Cockpit display device 78 may be configured in any suitable form including, for example, a display panel, a dashboard display, an augmented reality display or the like. Pilot system 56 may also include audio output and input devices such as a microphone, speakers and/or an audio port allowing an onboard pilot to communicate with, for example, air traffic control. Pilot system 56 also includes a plurality of user interface devices 80 to allow an onboard pilot to provide control commands to aircraft 10 including, for example, a control panel with switches or other inputs, mechanical control devices such as steering devices or sticks as well as other control devices.

Figure 4:
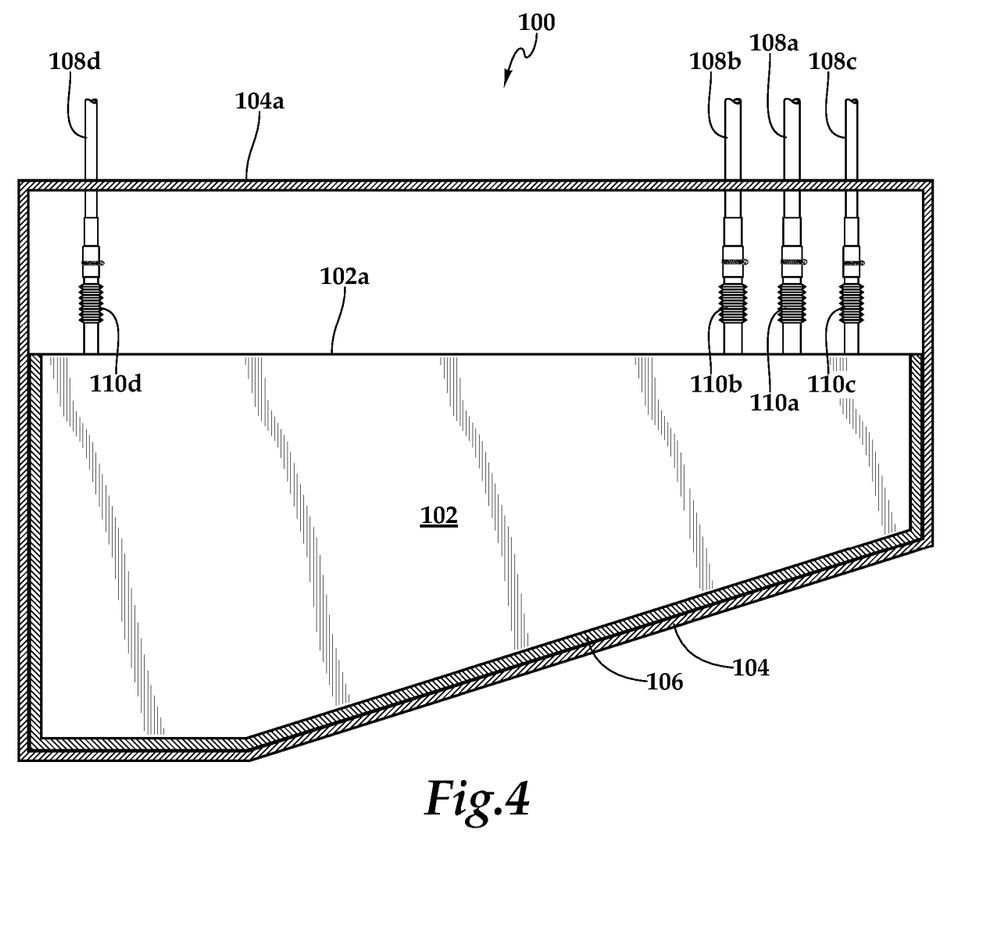
FIG. 4 is a schematic illustration of a fuel system with fluid line extension sleeves in accordance with embodiments of the present disclosure.
Figure 5A:
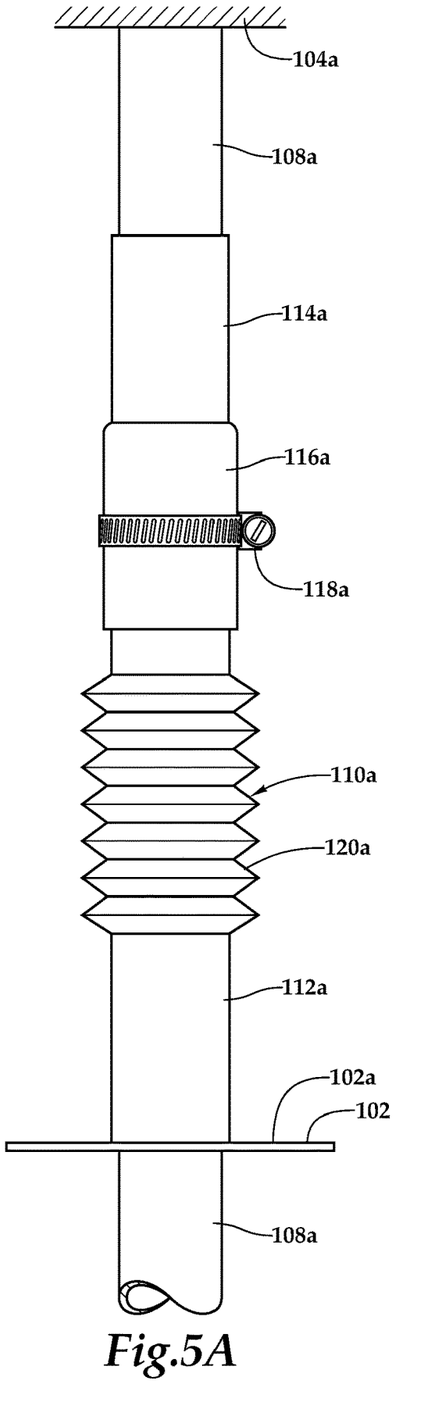
FIGS. 5A-5B are side views of a fluid line extension sleeve in its normal operating configuration and its extended configuration in accordance with embodiments of the present disclosure.
Figure 5B:
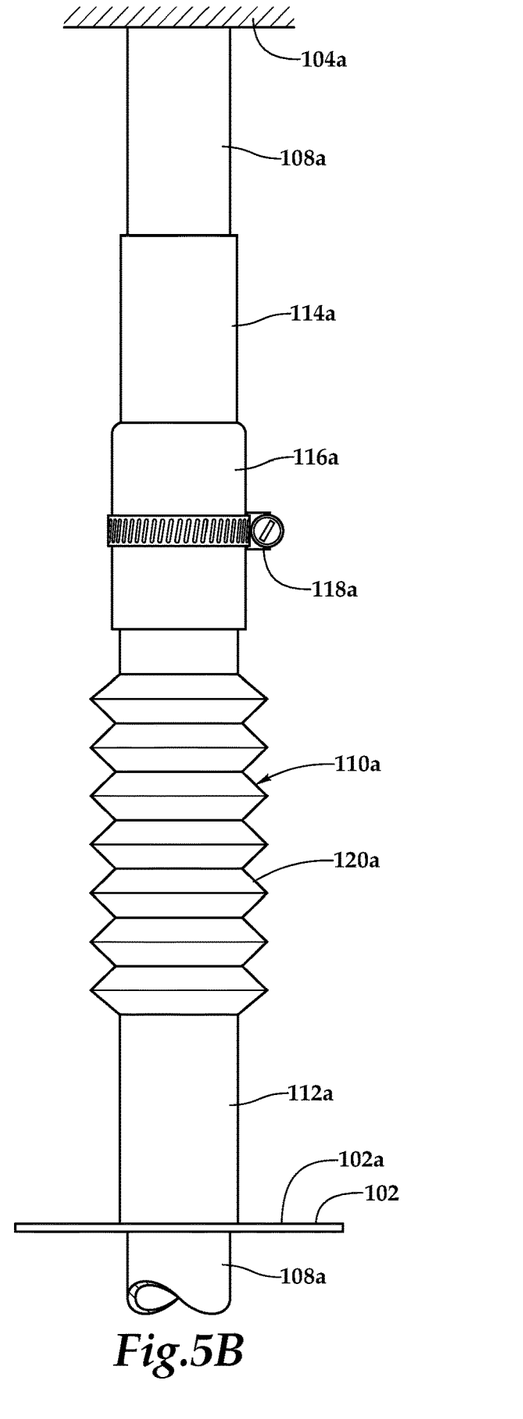
Figure 6A:
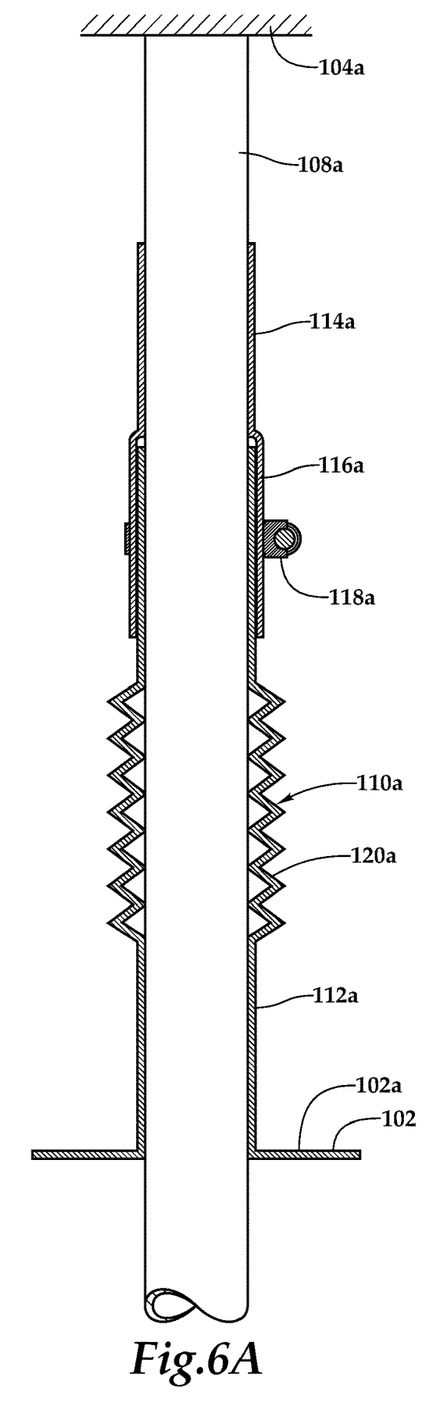
FIGS. 6A-6B are cross sectional views of a fluid line extension sleeve in its normal operating configuration and its extended configuration in accordance with embodiments of the present disclosure.
Figure 6B:
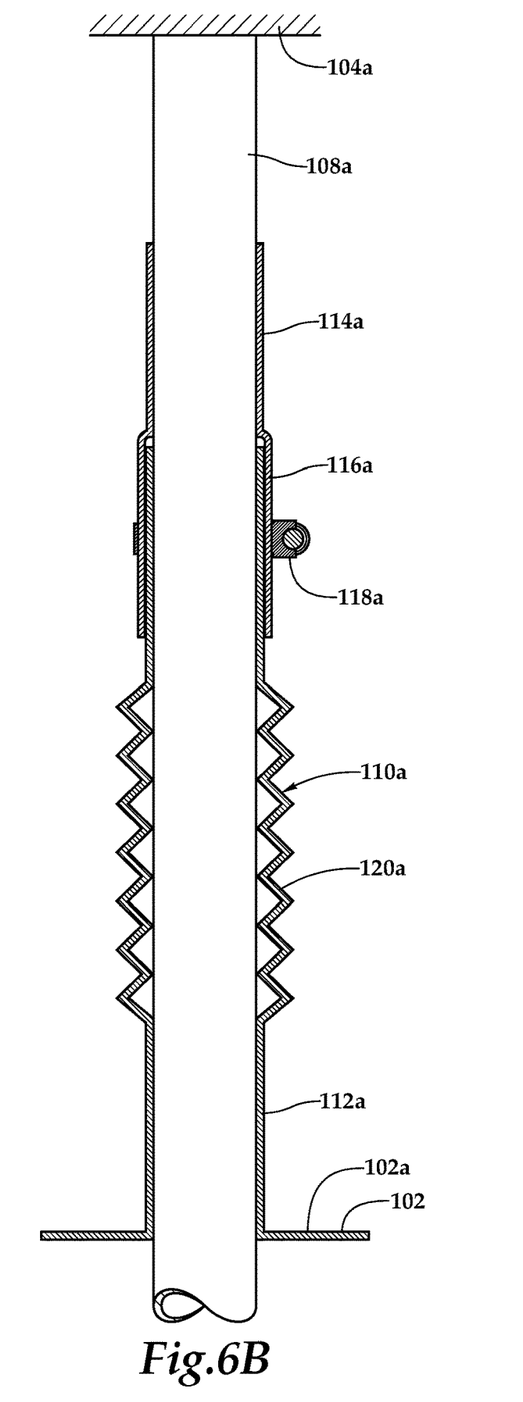

Referring next to FIG. 4 in the drawings, therein is depicted a more detailed view of a fuel system 100 for an aircraft such as aircraft 10. As illustrated, a fuel tank 102 is supported by a fuel tank airframe 104 preferably on a cushion of foam 106. Fuel tank airframe 104 includes an airframe member 104a that is positioned above fuel tank 102. Fuel tank 102 is preferably a flexible fuel bladder having suitable crash resistance and fuel tolerance. For example, fuel tank 102 may be a polymer based bladder such as a multilayer thermoplastic polymer bladder or an elastomer based bladder such as a vulcanized nitrile rubber bladder, an elastomer coated fabric bladder or a fiber reinforced elastomeric bladder. Fuel system 100 includes a plurality of non-extendable fluid lines such as fuel line 108a, a fill line 108b, a vent line 108c and a sensor line 108d. Fluid lines 108 are preferably formed from a lightweight metal such as aluminum. Each of fluid lines 108a, 108b, 108c, 108d extends through airframe member 104a and is preferably coupled to, secured to or otherwise anchored to airframe member 104a to prevent relative motion therebetween. Each of fluid lines 108a, 108b, 108c, 108d also extends through upper surface 102a of fuel tank 102 into the interior of fuel tank 102, as best seen in FIGS. 5A-5B and 6A-6B with respect to fuel line 108a.

During a hard landing or crash landing event, fuel tank 102 is configured to withstand the stresses and strains caused by the motion and inertia of the liquid fuel contained therein. The forces generated by the liquid fuel as well as other forces may cause fuel tank 102 to change shape and/or deform including causing relative movement between upper surface 102a of fuel tank 102 and airframe member 104a. To prevent such movement from transferring forces, such as tensile and compressive forces, to fluid lines 108, the present fuel system 100 utilizes sleeve assemblies 110a, 110b, 110c, 110d to couple fluid lines 108a, 108b, 108c, 108d to upper surface 102a of fuel tank 102, which enables relative motion between fuel tank 102 and fluid lines 108a, 108b, 108c, 108d.

As best seen in FIGS. 5A-5B and 6A-6B with respect to sleeve assembly 110a and fuel line 108a, sleeve assembly 110a includes an extension sleeve 112a and a sealing sleeve 114a that are positioned around fuel line 108a. An upper portion of sealing sleeve 114a forms a fluid tight seal with fuel line 108a. In addition, the upper portion of sealing sleeve 114a has a non-sliding relationship fuel line 108a. For example, sealing sleeve 112a may be formed as a silicone boot, such as a silicone rubber boot, and may be coupled to fuel line 108a with a heat treatment process to enable the fluid tight and non-sliding relationship therewith. In the illustrated embodiment, a lower portion of sealing sleeve 114a is positioned around an upper portion of extension sleeve 112a in an overlapping relationship to form a multilayer sleeve section 116a around fuel line 108a. One or more optional mechanical compression couplings, depicted as a worm screw clamp 118a, may be positioned around multilayer sleeve section 116a. The compression force generated by worm screw clamp 118a may be used to create a non-sliding relationship between multilayer sleeve section 116a and fuel line 108a.

Extension sleeve 112a may be formed from a polymer based material such as a thermoplastic polymer or an elastomer based material such as a vulcanized nitrile rubber, an elastomer coated fabric or a fiber reinforced elastomer. As such, extension sleeve 112a may be integrally formed with fuel tank 102. Alternatively, extension sleeve 112a may be formed independent of fuel tank 102 using similar or dissimilar materials and coupled to fuel tank 102 by co-curing, sewing or other suitable process depending upon the materials of extension sleeve 112a and fuel tank 102. A lower portion of extension sleeve 112a has a sliding relationship with fuel line 108a. In the illustrated embodiment, this is achieved by incorporating an accordion sleeve 120a into extension sleeve 112a.

As best seen by comparison of FIGS. 5A to 5B and 6A to 6B, accordion sleeve 120a allows sleeve assembly 110a to change length to compensate for relative movement between upper surface 102a of fuel tank 102 and airframe member 104a during, for example, a hard landing or crash landing event without transferring tensile or compressive force to fuel line 108a. As illustrated, when upper surface 102a of fuel tank 102 moves away from airframe member 104a such that the distance therebetween increases, the lower portion of extension sleeve 112a slides relative to fuel line 108a as accordion sleeve 120a increases in length, for example, moving from the position depicted in FIGS. 5A and 6A to the position depicted in FIGS. 5B and 6B. Similarly, when upper surface 102a of fuel tank 102 moves toward airframe member 104a such that the distance therebetween decreases, the lower portion of extension sleeve 112a slides relative to fuel line 108a as accordion sleeve 120a decreases in length, for example, moving from the position depicted in FIGS. 5B and 6B to the position depicted in FIGS. 5A and 6A. In this manner, the sliding relationship between the lower portion of extension sleeve 112a with fuel line 108a together with the variable length of accordion sleeve 120a prevent fuel line 108a from becoming damaged during a hard landing or crash landing event and thus prevent fuel leaks from fuel tank 102 and the resultant hazard of a fuel fire.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A fuel system for an aircraft having an airframe member, the fuel system comprising:
    a fuel tank configured to contain liquid fuel, the fuel tank having an upper surface;
    a non-extendable fluid line coupled between the airframe member and the fuel tank; and
    a sleeve assembly coupled between the fluid line and the upper surface of the fuel tank, the sleeve assembly including a sealing sleeve and an extension sleeve, the sealing sleeve positioned around the fluid line forming a fluid tight seal therewith and having a non-sliding relationship therewith, the extension sleeve positioned around the fluid line, a first portion of the extension sleeve having a sliding relationship with the fluid line such that increasing the distance between the upper surface of the fuel tank and the airframe member causes the extension sleeve to increase in length as the fluid line slides relative to the first portion of the extension sleeve.

2. The fuel system as recited in claim 1 wherein at least a portion of the sealing sleeve overlaps a second portion of the extension sleeve forming a multilayer sleeve section around the fluid line.

3. The fuel system as recited in claim 2 further comprising a mechanical compression coupling positioned around the multilayer sleeve section to create a non-sliding relationship between the fluid line and the second portion of the extension sleeve.

4. The fuel system as recited in claim 3 wherein the mechanical compression coupling further comprises a clamp.

5. The fuel system as recited in claim 3 wherein the mechanical compression coupling further comprises a worm screw clamp.

6. The fuel system as recited in claim 1 wherein the extension sleeve is integral with the fuel tank.

7. The fuel system as recited in claim 1 wherein the extension sleeve is coupled to the fuel tank.

8. The fuel system as recited in claim 1 wherein the extension sleeve further comprises a rubber sleeve.

9. The fuel system as recited in claim 1 wherein the first portion of the extension sleeve further comprises an accordion sleeve.

10. The fuel system as recited in claim 1 wherein the sealing sleeve further comprises a silicone boot.

11. The fuel system as recited in claim 1 wherein the sealing sleeve further comprises a silicone rubber boot.

12. The fuel system as recited in claim 1 wherein the fluid line further comprises a fuel line.

13. The fuel system as recited in claim 1 wherein the fluid line further comprises an aluminum fluid line.

14. The fuel system as recited in claim 1 wherein the fluid line extends into an interior of the fuel tank.

15. The fuel system as recited in claim 1 wherein the fuel tank further comprises a fuel bladder.

16. An aircraft comprising:
 a fuselage having a fuel tank airframe including an airframe member;
 a fuel tank supported by the fuel tank airframe and positioned below the airframe member, the fuel tank having an upper surface and configured to contain liquid fuel;
 a non-extendable fluid line coupled between the airframe member and the fuel tank; and
 a sleeve assembly coupled between the fluid line and the upper surface of the fuel tank, the sleeve assembly including a sealing sleeve and an extension sleeve, the sealing sleeve positioned around the fluid line forming a fluid tight seal therewith and having a non-sliding relationship therewith, the extension sleeve positioned around the fluid line, a first portion of the extension sleeve having a sliding relationship with the fluid line such that increasing the distance between the upper surface of the fuel tank and the airframe member causes the extension sleeve to increase in length as the fluid line slides relative to the first portion of the extension sleeve.

17. The aircraft as recited in claim 16 wherein the aircraft further comprises a rotorcraft.

18. The aircraft as recited in claim 16 wherein the aircraft further comprises a rotorcraft having a plurality of rotor systems.

19. The aircraft as recited in claim 16 wherein the aircraft further comprises an air taxi having a plurality of rotor systems.

20. The aircraft as recited in claim 19 further comprises a turbo-generator in fluid communication with the fuel tank via the fluid line, the turbo-generator including a gas turbine engine driving an electric generator, the electric generator charging an array of batteries that provides power to electric motors of the rotor systems.

* * * * *